US010092480B2

(12) United States Patent
Le et al.

(10) Patent No.: US 10,092,480 B2
(45) Date of Patent: Oct. 9, 2018

(54) TOUCHSCREEN-BASED CONTROL SYSTEM FOR MASSAGE CHAIRS

(71) Applicants: Kevin Le, Richland Hills, TX (US); Thanh Le, Grand Prairie, TX (US); Manthan Sheth, Arlington, TX (US)

(72) Inventors: Kevin Le, Richland Hills, TX (US); Thanh Le, Grand Prairie, TX (US); Manthan Sheth, Arlington, TX (US)

(73) Assignee: Luraco, Inc., Arlington, TX (US)

( * ) Notice: Subject to any disclaimer, the term of this patent is extended or adjusted under 35 U.S.C. 154(b) by 0 days.

(21) Appl. No.: 14/631,849

(22) Filed: Feb. 26, 2015

(65) Prior Publication Data

US 2015/0169124 A1     Jun. 18, 2015

Related U.S. Application Data

(63) Continuation-in-part of application No. 14/454,712, filed on Aug. 7, 2014, which is a continuation-in-part of application No. 14/103,840, filed on Dec. 11, 2013.

(51) Int. Cl.
| | |
|---|---|
| *G06F 3/041* | (2006.01) |
| *A61H 15/00* | (2006.01) |
| *A61H 23/00* | (2006.01) |

(52) U.S. Cl.
CPC ......... *A61H 15/0078* (2013.01); *A61H 15/00* (2013.01); *A61H 23/006* (2013.01); *G06F 3/0412* (2013.01); *A61H 2015/0028* (2013.01); *A61H 2015/0035* (2013.01); *A61H 2201/0149* (2013.01); *A61H 2201/0207* (2013.01); *A61H 2201/1669* (2013.01); *A61H 2201/1676* (2013.01); *A61H 2201/5005* (2013.01); *A61H 2201/5012* (2013.01); *A61H 2201/5035* (2013.01); *A61H 2201/5038* (2013.01);
(Continued)

(58) Field of Classification Search
CPC .......................... G06F 3/0412; G06F 3/0416
See application file for complete search history.

(56) References Cited

U.S. PATENT DOCUMENTS

| | | | |
|---|---|---|---|
| 3,532,089 A | 10/1970 | Arntzenius | |
| 4,422,448 A | 12/1983 | Sugai et al. | |

(Continued)

FOREIGN PATENT DOCUMENTS

| | | |
|---|---|---|
| CN | 1446529 A | 12/2002 |
| CN | 100398081 C | 7/2008 |

(Continued)

OTHER PUBLICATIONS

"MassageChairStore.com," downloaded Sep. 12, 2013, <URL:http://www.massagechairstore.com/>.

(Continued)

*Primary Examiner* — Towfiq Elahi
(74) *Attorney, Agent, or Firm* — Hoang Steve Ngo

(57) ABSTRACT

The present invention is a touchscreen-based control system for massage chairs that includes a touchscreen device. In another aspect, the present invention is a massage chair controlled by a touchscreen-based control system that includes a touchscreen-based control system. In a further aspect, the present invention is a massage chair controlled by a touchscreen-based control system that includes a touchscreen-based control system and at least one health monitoring device or system.

33 Claims, 20 Drawing Sheets

(52) U.S. Cl.
CPC ............... *A61H 2201/5046* (2013.01); *A61H 2205/081* (2013.01); *A61H 2205/106* (2013.01); *A61H 2205/108* (2013.01); *A61H 2230/00* (2013.01); *A61H 2230/06* (2013.01); *A61H 2230/202* (2013.01); *A61H 2230/30* (2013.01)

(56) References Cited

U.S. PATENT DOCUMENTS

| | | |
|---|---|---|
| 4,422,449 A | 12/1983 | Hamabe |
| 4,574,786 A | 3/1986 | Hashimoto et al. |
| 5,020,518 A | 6/1991 | Spears et al. |
| 5,233,973 A | 8/1993 | Gill et al. |
| 5,304,112 A | 4/1994 | Mrklas et al. |
| 5,769,799 A | 6/1998 | Daughtry |
| 5,792,047 A | 8/1998 | Coggins |
| 5,993,401 A | 11/1999 | Inbe et al. |
| 6,171,266 B1 | 1/2001 | Inada et al. |
| 6,224,563 B1 | 5/2001 | Nonoue et al. |
| 6,394,970 B1 | 5/2002 | Maier |
| 6,494,850 B1 | 12/2002 | Kitadou et al. |
| 6,511,448 B1 | 1/2003 | Furuie et al. |
| 6,540,701 B1 | 4/2003 | Inada |
| 6,629,939 B2 | 10/2003 | Jikiba et al. |
| 6,656,140 B2 | 12/2003 | Oguma et al. |
| RE38,419 E * | 2/2004 | Auer .................... G06F 1/1626 345/173 |
| 6,695,799 B2 | 2/2004 | Kitadou et al. |
| 6,749,577 B2 | 6/2004 | Kume et al. |
| 6,899,687 B2 | 5/2005 | Hori et al. |
| 6,991,609 B2 | 1/2006 | Kan et al. |
| 7,806,840 B2 | 10/2010 | Chen |
| 7,854,710 B2 | 12/2010 | Liang |
| 7,947,002 B2 | 5/2011 | Mizoguchi et al. |
| 2002/0138023 A1 | 9/2002 | Kume et al. |
| 2002/0193713 A1 | 12/2002 | Lee |
| 2004/0122343 A1 | 6/2004 | Mori et al. |
| 2004/0158181 A1 | 8/2004 | Watanabe et al. |
| 2005/0090769 A1 | 4/2005 | Chen |
| 2005/0113723 A1* | 5/2005 | Ueyama ............ A61H 15/0078 601/15 |
| 2005/0192520 A1 | 9/2005 | Morita et al. |
| 2005/0242635 A1 | 11/2005 | Cassaday |
| 2006/0111653 A1 | 5/2006 | Nishio et al. |
| 2007/0239089 A1 | 10/2007 | Chiu |
| 2007/0299377 A1 | 12/2007 | Shiraishi |
| 2008/0009777 A1 | 1/2008 | Chiu |
| 2008/0097260 A1 | 4/2008 | Tsukada et al. |
| 2009/0306558 A1 | 12/2009 | Chen |
| 2009/0306588 A1 | 12/2009 | Nguyen |
| 2010/0030121 A1 | 2/2010 | Fu |
| 2010/0249613 A1* | 9/2010 | Hashimoto ........ A61B 5/02405 600/485 |
| 2011/0055720 A1* | 3/2011 | Potter .................... G06F 3/017 715/747 |
| 2011/0077561 A1* | 3/2011 | Choly ................ G06F 3/04883 601/15 |
| 2012/0011438 A1* | 1/2012 | Kim ...................... G06F 1/1626 715/702 |
| 2012/0215143 A1 | 8/2012 | Inada |
| 2013/0088059 A1 | 4/2013 | Nagamitsu |
| 2015/0051526 A1* | 2/2015 | Wang ...................... A47C 7/70 601/99 |

FOREIGN PATENT DOCUMENTS

| | | |
|---|---|---|
| CN | 101744707 B | 10/2011 |
| EP | 1230904 A2 | 8/2002 |
| EP | 1210927 B1 | 1/2005 |
| JP | H06209 A | 1/1994 |
| JP | H1119150 A | 1/1999 |
| JP | 2000342644 | 12/2000 |

OTHER PUBLICATIONS

"How Massage Chairs Work," downloaded Sep. 12, 2013, <URL:http://electronics.howstuffworks.com/gadgets/home/massage-chair1.htm>.

"Osaki OS-4000 Instruction Manual," downloaded Sep. 12, 2013, <URL:http://www.hitechmassagechairs.com/PDF/OS-4000-Manual.pdf>.

"Luminous-spa-pedicure-chair-owner-manual," downloaded Aug. 15, 2016, <URL:http://uspedicurespa.com/resources/lexor/luminous-spa-pedicure-chair-owner-manual.pdf>.

* cited by examiner

TOUCHSCREEN-BASED CONTROL SYSTEM FOR MASSAGE CHAIRS

CROSS-REFERENCE TO RELATED APPLICATIONS

The present application claims the priority benefit of both U.S. Nonprovisional patent application Ser. No. 14/103,840, filed Dec. 11, 2013, and U.S. Nonprovisional patent application Ser. No. 14/454,712, filed Aug. 7, 2014, which are incorporated herein by reference in their entireties.

BACKGROUND OF THE INVENTION

Field of the Invention

The present invention generally relates to massage chairs and control systems for massage chairs. More specifically, the present invention is a touchscreen-based control system for massage chairs. Also, the present invention is a massage chair controlled by a touchscreen-based control system. that includes a touchscreen-based control system. Further, the present invention is a massage chair controlled by a touchscreen-based control system that includes a touchscreen-based control system and at least one health monitoring device or system.

Description of the Related Art

Massage chairs and control systems for massage chairs are known in the art.

Advantages of the Present Invention

One major advantage touchscreens or touchscreen devices have over other input methods is ease of use. While the usual keypad is familiar to most users, the practice of reaching out and touching icons on a screen comes intuitively even to those without a tech background. The biggest benefit of touchscreen technology is how easy it is to use. A user can just tap an icon to activate it, and on computers, smartphones and tablets, the user can scroll pages with just a flick of the user's finger(s).

Touchscreens provide fast access to any and all types of digital media, with no text-bound interface getting in the way. Touchscreens have the potential to be more comfortable for the user. Impaired individuals can use touchscreen technology, especially those who find using a mouse or keyboard difficult.

Touchscreen-based systems virtually eliminate errors because users select from clearly defined menus. The information on each screen is limited in number and options, thus providing step-by-step, fail-safe sequences to guide the user through complex procedures.

Touchscreens are also valuable in accommodating users with physical issues that might make a traditional remote keypad setup difficult to use.

While one might think that a touchscreen gets dirty quickly, one can actually easily clean it by simply wiping the screen. Touchscreens are generally made of glass or a similar hard-coated surface. So it's easy to clean and therefore extremely well suited for the typical environments found in restaurants, hospitals, and the food and pharmaceutical industries. Touchscreens have smooth, flat screens, which makes cleaning a much easier task. Devices which do not require a keyboard tend to collect less dust. The function of the computer mouse is eliminated as well—a device with many crevices that are difficult to clean. The wireless nature of touchscreens also eliminates the mess of tangled power cords.

The devices with keypads are susceptible to damage. For instance, a keyboard or a keypad has separate keys and related circuits, any of which can break or become inoperable due to dirt, crumbs, water damage, etc. In contrast, touchscreens can be protected more easily because they do not have as many parts. This means that touchscreens have the potential to have a longer product life than standard monitors and computer systems.

By combining the data entry method with the display, the overall size of the device is reduced significantly. This advantage is most obvious when it comes to portable devices.

The present invention overcomes one or more of the shortcomings of the prior art. The Applicant is unaware of inventions or patents, taken either singly or in combination, which are seen to describe the present invention as claimed.

SUMMARY OF THE PRESENT INVENTION

The present invention is a touchscreen-based control system for massage chairs. In another aspect of the present invention, the present invention is a massage chair controlled by a touchscreen-based control system that includes a touchscreen-based control system. In a further aspect of the present invention, the present invention is a massage chair controlled by a touchscreen-based control system that includes a touchscreen-based control system and at least one health monitoring device or system.

The touchscreen-based control system allows a user of a massage chair to gain access to providable information by selecting various selectable selections and tabs with the use of one or more fingers of the user.

In a preferred and non-limiting embodiment of an aspect of the present invention, the touchscreen-based control system includes a touchscreen device in operative communication with a massage chair.

The touchscreen device preferably comprises some, most or all of the following components: a housing, a touch-sensitive layer or surface, a touch controller, a processor or operating system, a display controller, a display layer or surface, software, software program or application (app) comprising providable information that may be provided to a user in response to touch inputs from the user, and software, software program or application (app) in operative communication with the massage chair.

Figure 1:
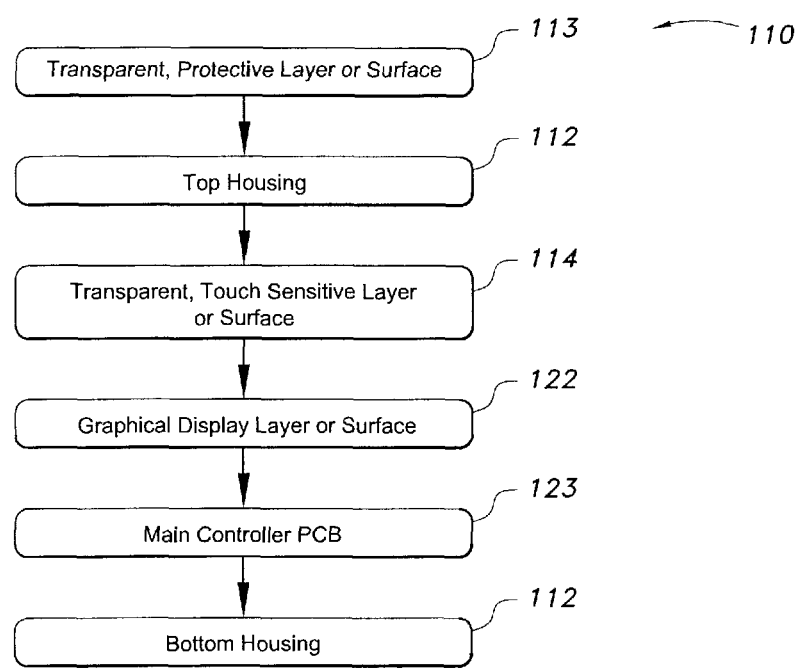
FIG. 1 is a block diagram of a non-limiting example of a hardware assembly of a touchscreen device of a touchscreen-based control system according to the present invention.

It should be understood that the above-attached figures are not intended to limit the scope of the present invention in any way.

DETAILED DESCRIPTION OF THE PRESENT INVENTION

Referring to FIGS. 1-10, the present invention is a touchscreen-based control system 100 for massage chairs. Referring to FIGS. 11-19 and in another aspect of the present invention, the present invention is a massage chair 200 controlled by a touchscreen-based control system that includes a touchscreen-based control system. Referring to FIG. 20 and in a further aspect of the present invention, the present invention is a massage chair 2000 controlled by a touchscreen-based control system that includes a touchscreen-based control system and at least one health monitoring device or system 2100.

The touchscreen-based control system 100 allows a user of a massage chair to gain access to providable information by selecting various selectable selections and tabs, such as, but not limited to, the modes of massages; massage intensity settings, chair position settings, chair heat settings and any combination(s) thereof; the Internet; songs; radio stations; etc., with the use of one or more fingers of the user.

In a preferred and non-limiting embodiment of an aspect of the present invention, the touchscreen-based control system 100 includes a touchscreen device 110 in operative communication with a massage chair MC.

As best shown in FIGS. 1, 2 and 5-10, touchscreen device 110 preferably comprises a housing 112, a protective layer or surface 113, a touch-sensitive layer or surface 114, a touch controller 116, a processor or operating system 118, a display controller 120, a display layer or surface 122, a main controller printed circuit board (PCB) or motherboard 123, software, software program or application (app) 124 comprising providable information that may be provided to a user in response to touch inputs from the user, and software, software program or application (app) 126 in operative communication with the massage chair MC. The touchscreen device 110 may be an LCD touchscreen device, an LED touchscreen device, or any other type of touchscreen device known to one of ordinary skill in the art.

Figure 10:
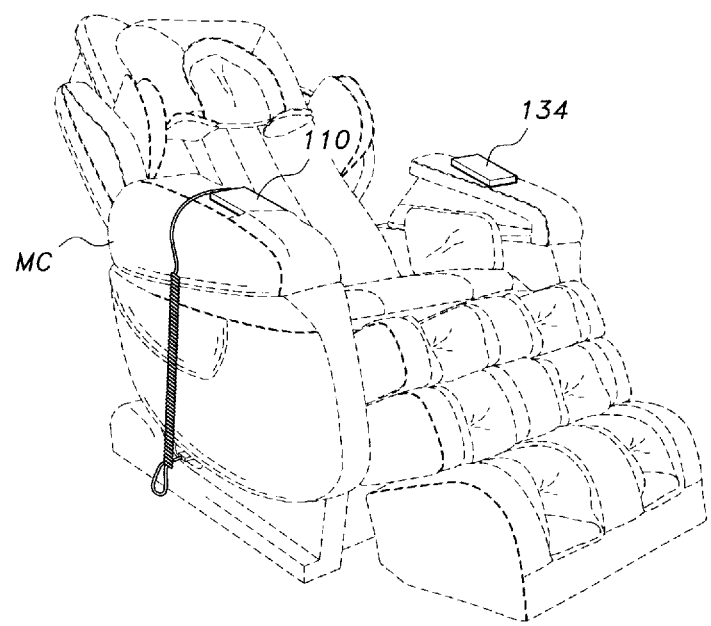
FIG. 10 is an environmental, perspective view of a touchscreen-based control system according to the present invention, showing a touchscreen device and a remote control.

As best shown in FIGS. 1 and 10, the housing 112 preferably houses most or all of the components of the touchscreen device 110. The housing 112 may be any housing known to one of ordinary skill in the art.

As best shown in FIGS. 1 and 5-9, the protective layer or surface 113 protects the touch-sensitive layer or surface 114 and possibly other components housed in the touchscreen device 110 from damage or breakage arising from scratches, device drops, fluid spills, etc. For best effectiveness, it is preferred that the protective layer or surface 113 is a transparent, protective layer or surface. The transparent, protective layer or surface 113 may be any transparent, protective layer or surface known to one of ordinary skill in the art.

As best shown in FIGS. 1 and 5-9, the touch-sensitive layer or surface 114 receives touch inputs from the user (not shown) to communicate with the massage chair MC whereby the massage chair MC communicates with a massage device (not shown) of the massage chair MC to provide massage effects to the user. For best effectiveness, it is preferred that the touch-sensitive layer or surface 114 is a transparent, touch-sensitive layer or surface. The transparent, touch-sensitive layer or surface 114 may be any transparent, touch-sensitive layer or surface known to one of ordinary skill in the art.

Figure 2:
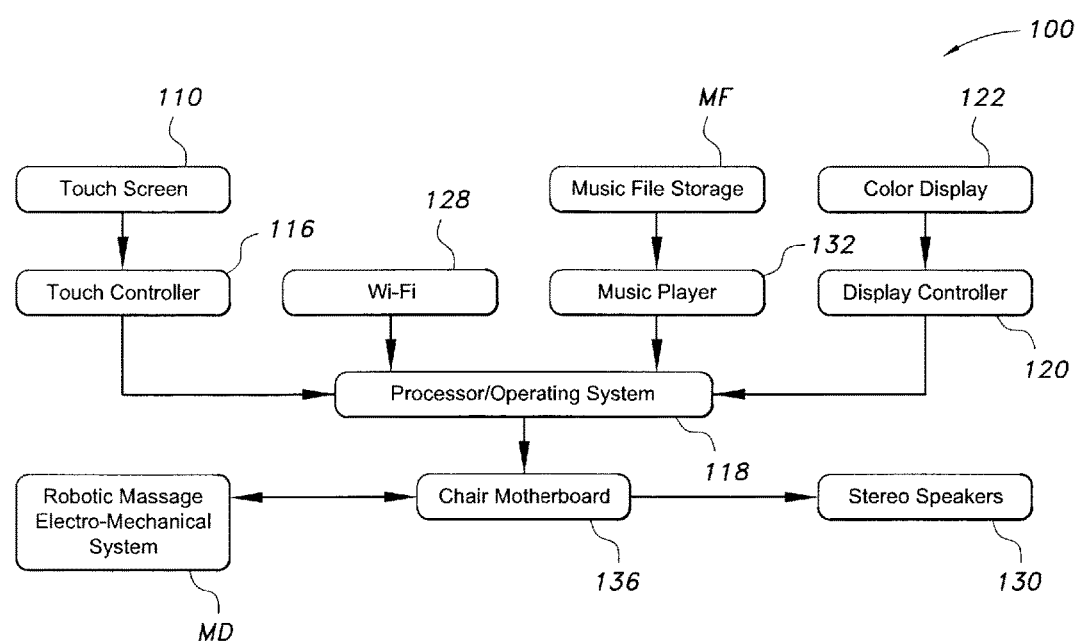
FIG. 2 is a block diagram of a non-limiting example of a hardware system of a touchscreen-based control system according to the present invention, showing the touchscreen-based control system in communication with a massage chair.

As best shown in FIG. 2, the touch controller 116 identifies touch inputs from the user. The touch controller 116 may be any touch controller known to one of ordinary skill in the art.

As best shown in FIG. 2, the processor 118 processes the touch inputs and operatively communicates with the display controller 120. The processor 118 may be any processor or operating system known to one of ordinary skill in the art.

As best shown in FIG. 2, the display controller 120 generates video signals of the selected information and/or selected selection SI to be displayed on the display surface 122. The display controller 120 may be any display controller known to one of ordinary skill in the art.

As best shown in FIGS. 5-9, the display layer or surface 122 displays the selected information and/or selected selection SI that were derived from the touch inputs. Preferably, the display layer or surface 122 is a graphical display layer or surface. The display layer or surface 122 may be any display layer or surface known to one of ordinary skill in the art.

As best shown in FIG. 1, the main controller printed circuit board (PCB) or motherboard 123 may be any main controller printed circuit board (PCB) or motherboard known to one of ordinary skill in the art.

Figure 3:
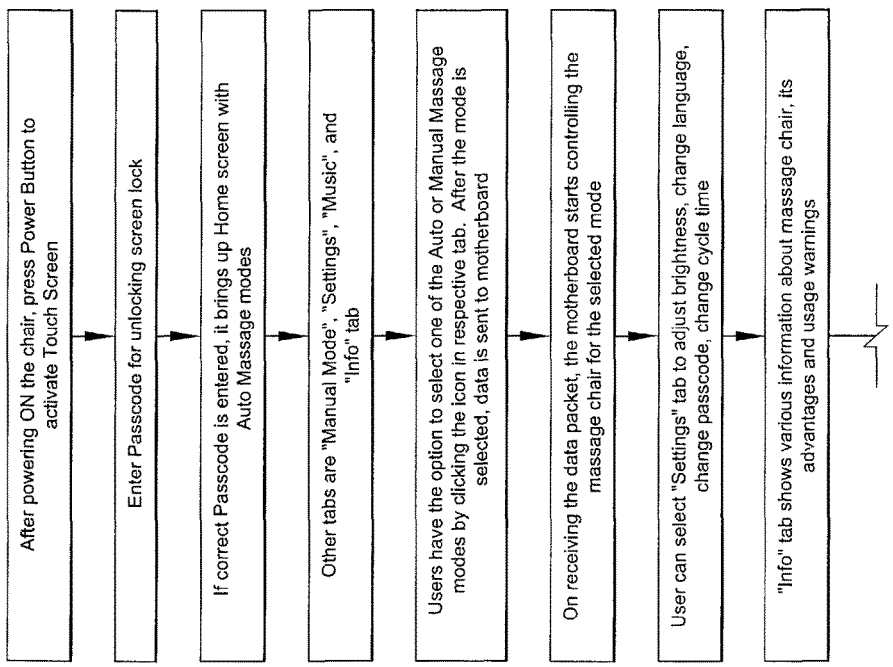
FIG. 3 is a partial flow chart (first portion) of a non-limiting example of a method or process performed by a software system or program of a touchscreen-based control system according to the present invention.
Figure 4:
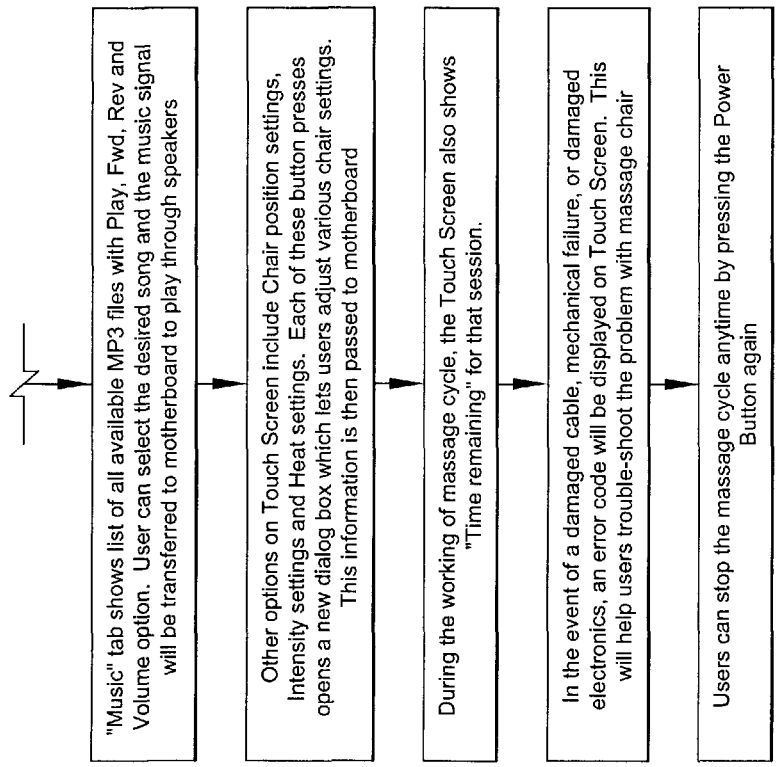
FIG. 4 is a partial flow chart (second portion) of a non-limiting example of a method or process performed by a software system or program of the touchscreen-based control system of FIG. 3, completing the partial flow chart shown in FIG. 3.

As best shown in FIGS. 3 and 4, the software 124 comprises providable information that may be provided to a user in response to touch inputs from the user.

As best shown in FIGS. 3 and 4, the software 126 in operative communication with the massage chair MC effectuates the massage chair MC to communicate with the massage device to provide massage effects to the user in response to the touch inputs.

For simplicity purposes, software 124 and software 126 may be combined into a single software, software program or application (app).

As best shown in FIGS. 5-9, the providable information preferably is accessed and selected by the user through the user's touch inputs of the applicable selectable selections SS and tabs T1, T2, T3, T4, T5. The providable information preferably includes a plurality of selectable massage intensity settings, chair position settings, chair heat settings, and any combination(s) thereof (via applicable selectable selections SS); at least an "Auto" ("Automatic") mode (via the "Auto" tab T1) of massage and a "Manual" mode (via the "Manual" tab T2) of massage; health-related information (via the "Info" tab T5); a plurality of songs stored in a music file MF (via the "Music" tab T4); chair and safety related information (via the "Info" tab T5); and settings (via the "Settings" tab T3) related information, such as, but not limited to, brightness of the display, language of the providable information, passcode, and cycle time. Preferably, certain selectable selections SS, such as the modes of massages; massage pressure levels; massage intensity settings, chair position settings, chair heat settings and any combination(s) thereof; songs; and radio stations, that a user may select are predetermined selections. When the Internet is accessible, then the providable information may also include some, most or all of the information that can be accessed via the Internet.

The touchscreen-based control system 100 or the touchscreen device 110 may further include a device for providing Internet access 128, at least one speaker 130, a music player 132, and a remote control 134 that is in operative communication with the massage chair MC.

As best shown in FIG. 2, the device for providing Internet access 128, preferably via Wi-Fi, allows the user to browse, surf or access the Internet, play games, play music, upgrade system software, etc. Alternatively, the device for providing Internet access 128 may be any known technology or device known to one of ordinary skill in the art.

As best shown in FIG. 2, the at least one speaker 130 is preferably stereo speakers, and may be integrated within the touchscreen device 110, integrated within the massage chair MC, or a separate component. The at least one speaker 130 may be any speaker(s) known to one of ordinary skill in the art.

As best shown in FIG. 2, the music player 132 may be integrated within the touchscreen device 110, integrated within the massage chair MC, or a separate component. The music player 132 may be any music player known to one of ordinary skill in the art.

The remote control 134 may also be used by the user to communicate with the massage chair MC to effectuate desired results. Preferably, the remote control 134 communicates with the massage chair MC via a chair motherboard 136. The remote control 134 may be any remote control known to one of ordinary skill in the art that can operatively communicate with the massage chair MC.

FIG. 1 shows a block diagram of a non-limiting example of a hardware assembly of the touchscreen device 110 of the touchscreen-based control system 100. Preferably, the protective layer or surface 113 is positioned proximately to the top portion of the housing 112 and above the touch-sensitive layer or surface 114; the touch-sensitive surface 114 is positioned above the display layer or surface 122; the display layer or surface 122 is positioned above the motherboard 123; and the motherboard 123 is positioned about the bottom portion of the housing 112.

FIG. 2 shows a block diagram of a non-limiting example of a hardware system of the touchscreen-based control system 100, which is in communication with a massage chair MC.

FIG. 3 shows a partial flow chart (first portion) of a non-limiting example of a method or process performed by a software system or program 124, 126 of the touchscreen-based control system 100.

FIG. 4 shows a partial flow chart (second portion) of a non-limiting example of a method or process performed by the software system or program 124, 126 of the touchscreen-based control system 100, completing the partial flow chart shown in FIG. 3.

Figure 5:
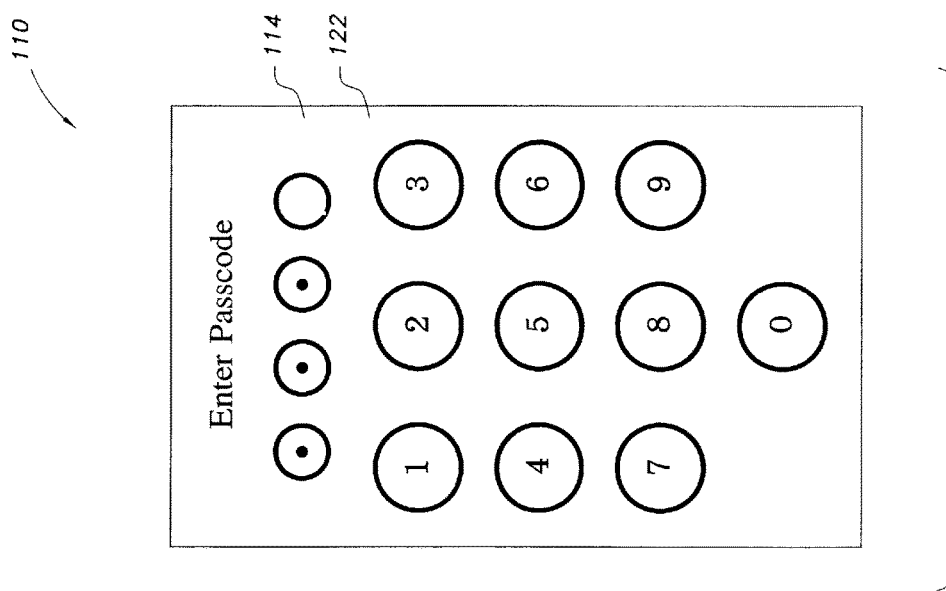
FIG. 5 is a front view of a touchscreen device of a touchscreen-based control system according to the present invention, showing a non-limiting example of an "Enter Passcode" screen page.

FIG. 5 shows a front view of the touchscreen device 110 of the touchscreen-based control system 100, showing a non-limiting example of an "Enter Passcode" screen page.

Figure 6:
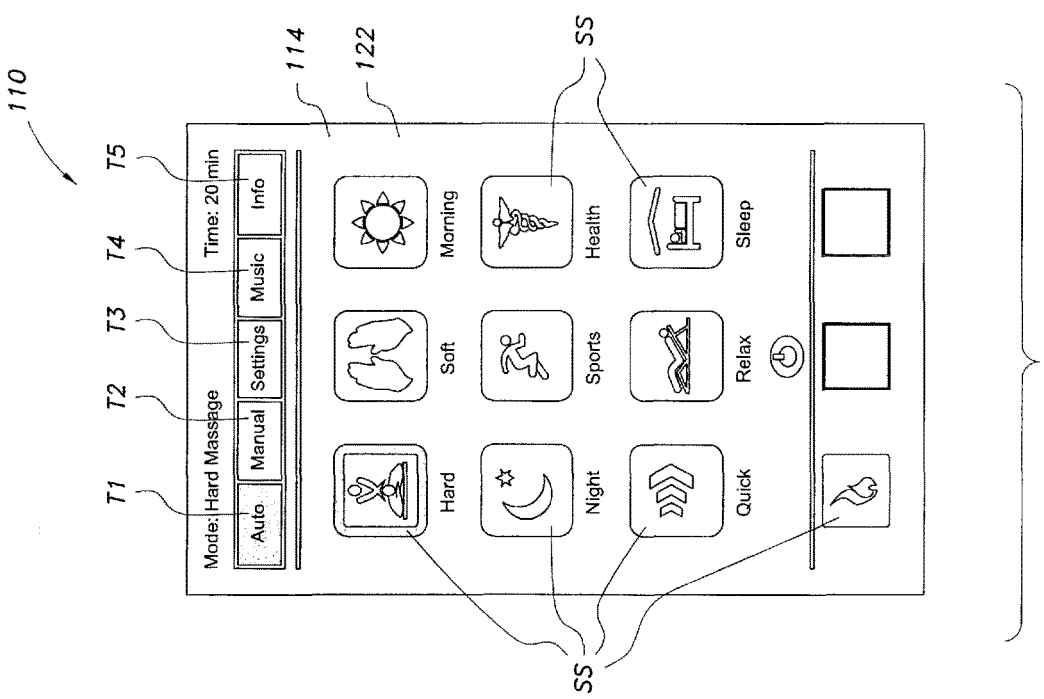
FIG. 6 is a front view of a touchscreen device of a touchscreen-based control system according to the present invention, showing a non-limiting example of a screen page where a user may select selectable selections provided on the screen page.

FIG. 6 shows a front view of the touchscreen device 110 of the touchscreen-based control system 100, showing a non-limiting example of a screen page where a user may select selectable selections provided on the screen page.

Figure 7:
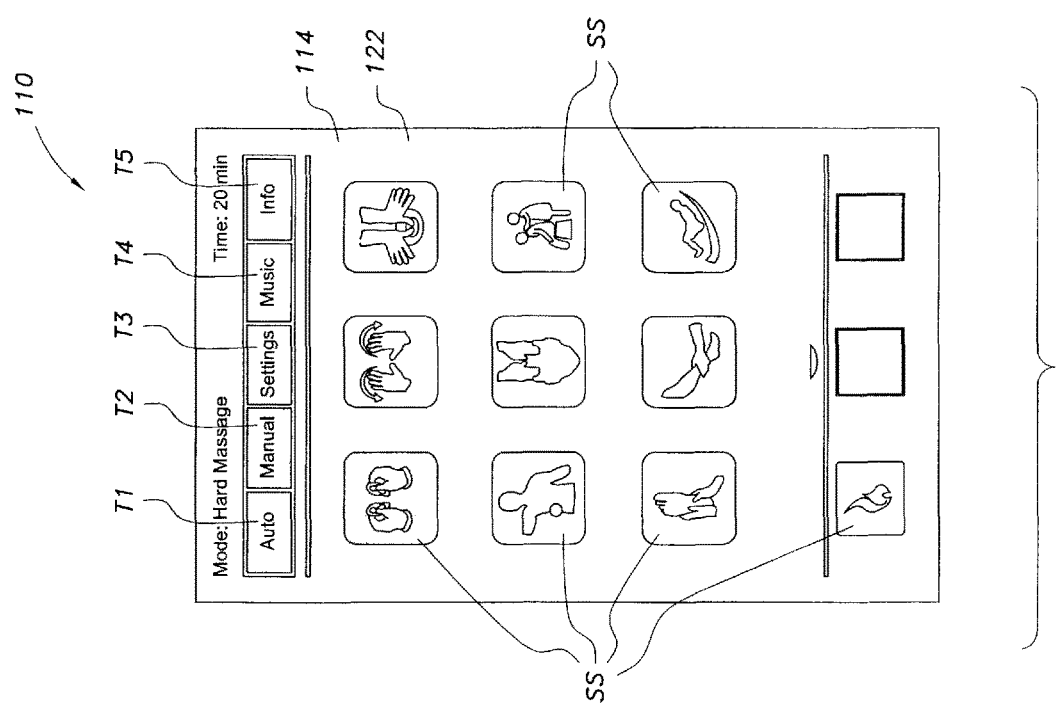
FIG. 7 is a front view of a touchscreen device of a touchscreen-based control system according to the present invention, showing a non-limiting example of another screen page where a user may select selectable selections provided on the screen page.

FIG. 7 shows a front view of the touchscreen device 110 of the touchscreen-based control system 100, showing a non-limiting example of another screen page where a user may select selectable selections provided on the screen page.

Figure 8:
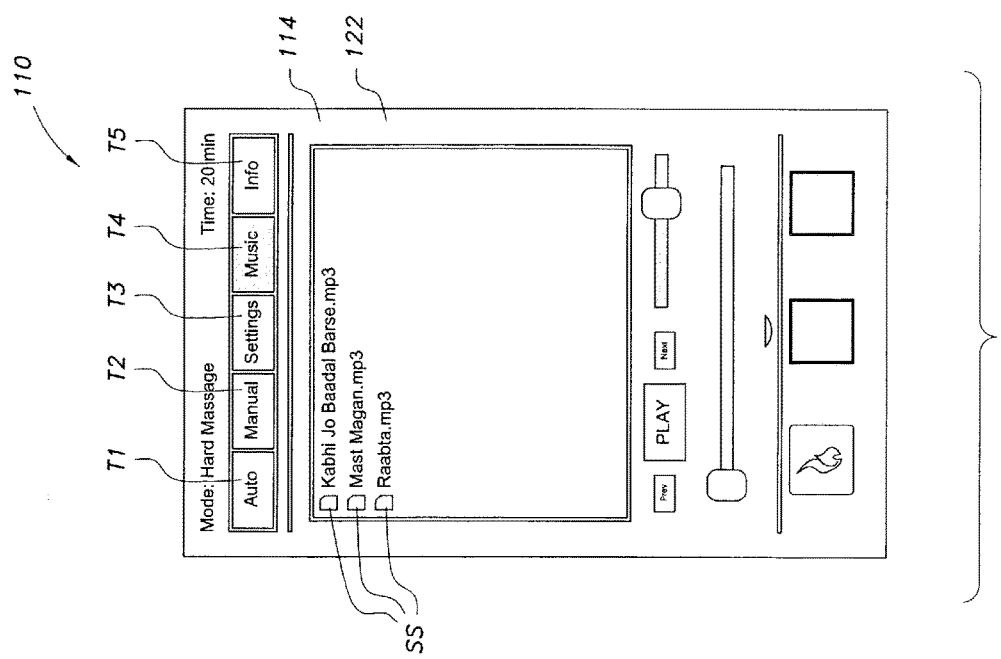
FIG. 8 is a front view of a touchscreen device of a touchscreen-based control system according to the present invention, showing a non-limiting example of an a further screen page where a user may select selectable selections provided on the screen page.

FIG. 8 shows a front view of the touchscreen device 110 of the touchscreen-based control system 100, showing a non-limiting example of an a further screen page where a user may select selectable selections provided on the screen page.

Figure 9:
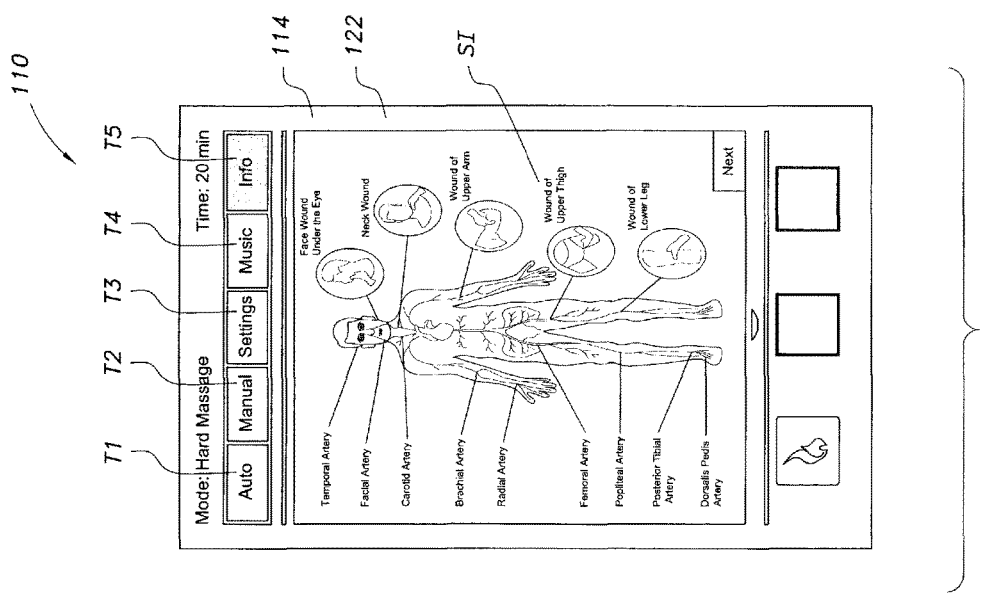
FIG. 9 is a front view of a touchscreen device of a touchscreen-based control system according to the present invention, showing a non-limiting example of an additional screen page where a user may obtain and/or view provideable information shown on the screen page.

FIG. 9 shows a front view of the touchscreen device 110 of the touchscreen-based control system 100, showing a non-limiting example of an additional screen page where a user may obtain and/or view provideable information shown on the screen page.

FIG. 10 shows an environmental, perspective view of the touchscreen device 110 and remote control 134 of the touchscreen-based control system 100.

Referring to FIGS. 11-19 and in a preferred and non-limiting embodiment of another aspect of the present invention, the massage chair 200 controlled by a touchscreen-based control system includes a chair 201 comprising a massage device 1170 that provides massage effects to a user, and a touchscreen-based control system comprising a touchscreen device in operative communication with the chair 201. Preferably, the touchscreen-based control system in this aspect of the present invention is the touchscreen-based control system 100 described above.

Figure 11:
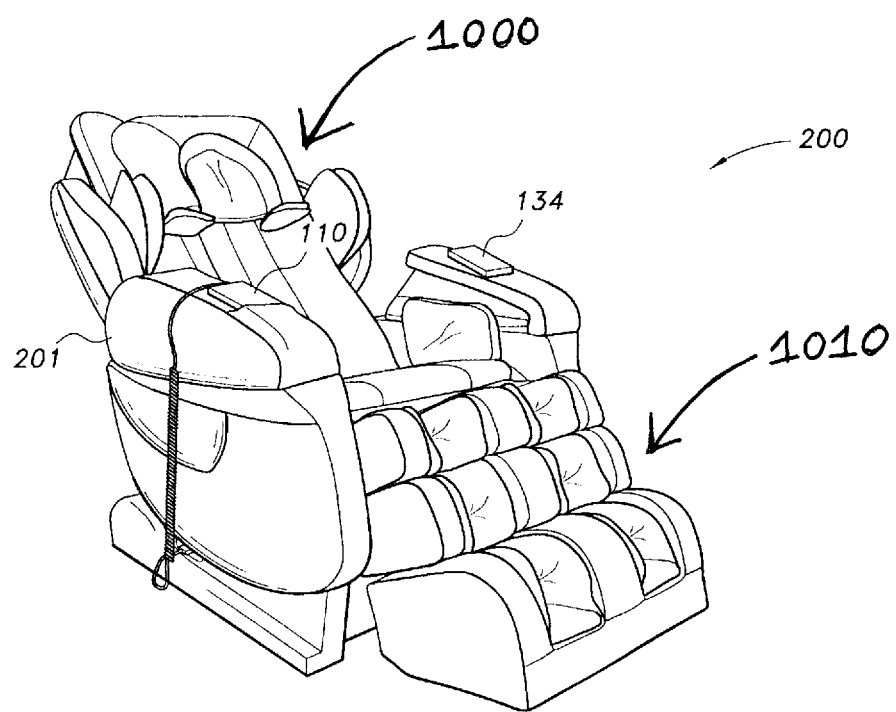
FIG. 11 is a perspective view of a massage chair controlled by touchscreen-based control system according to the present invention.

Preferably, as shown in FIG. 11, the chair 201 also includes a massage apparatus 1000 and a feet and legs massage apparatus 1010.

Preferably, the massage apparatus 1000 helps to provide massage benefits or effects to a back body area, a bottom body area, and a thigh body area of a user (not shown). Massage benefits or effects may also be provided to a head and neck body area of the user. The massage apparatus 1000 includes a frame 1100 and the massage device 1170. The feet and legs massage apparatus 1010 helps to provide massage benefits or effects to a feet and legs area of a user (not shown).

Figure 12:
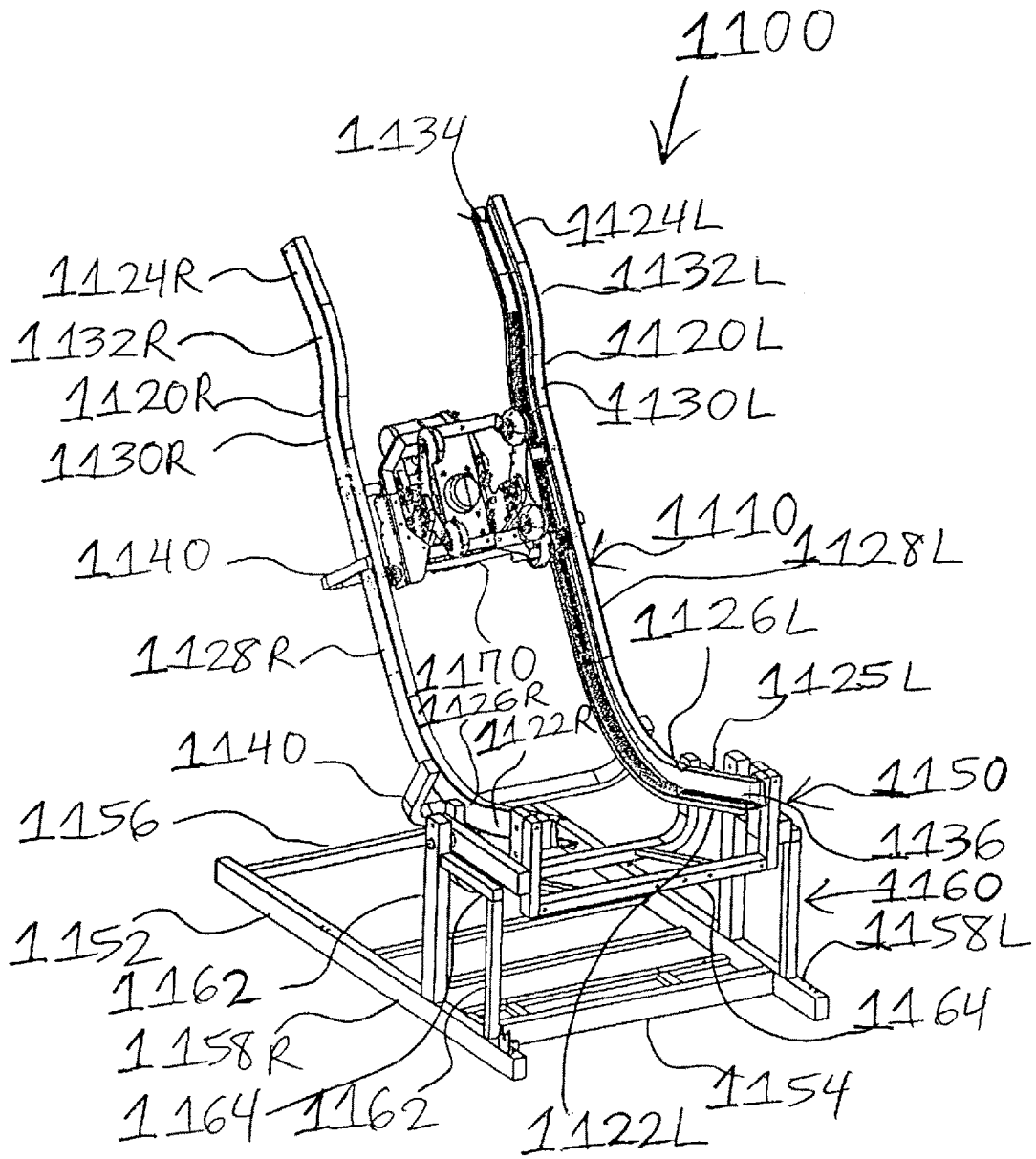
FIG. 12 is a perspective view of a massage apparatus for a massage chair controlled by touchscreen-based control system according to the present invention.
Figure 13:
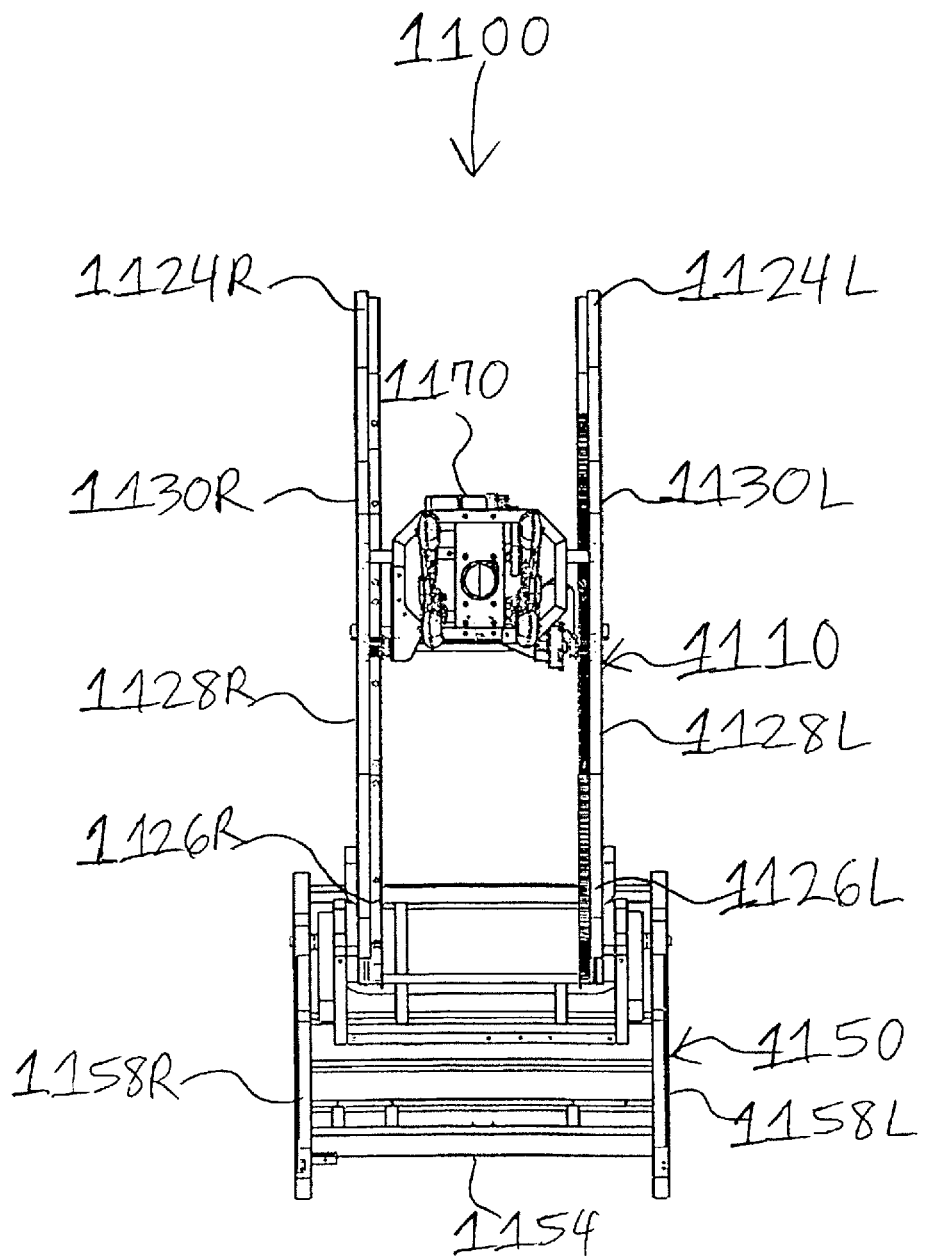
FIG. 13 is a front view of the massage apparatus for a massage chair of FIG. 12.
Figure 14:
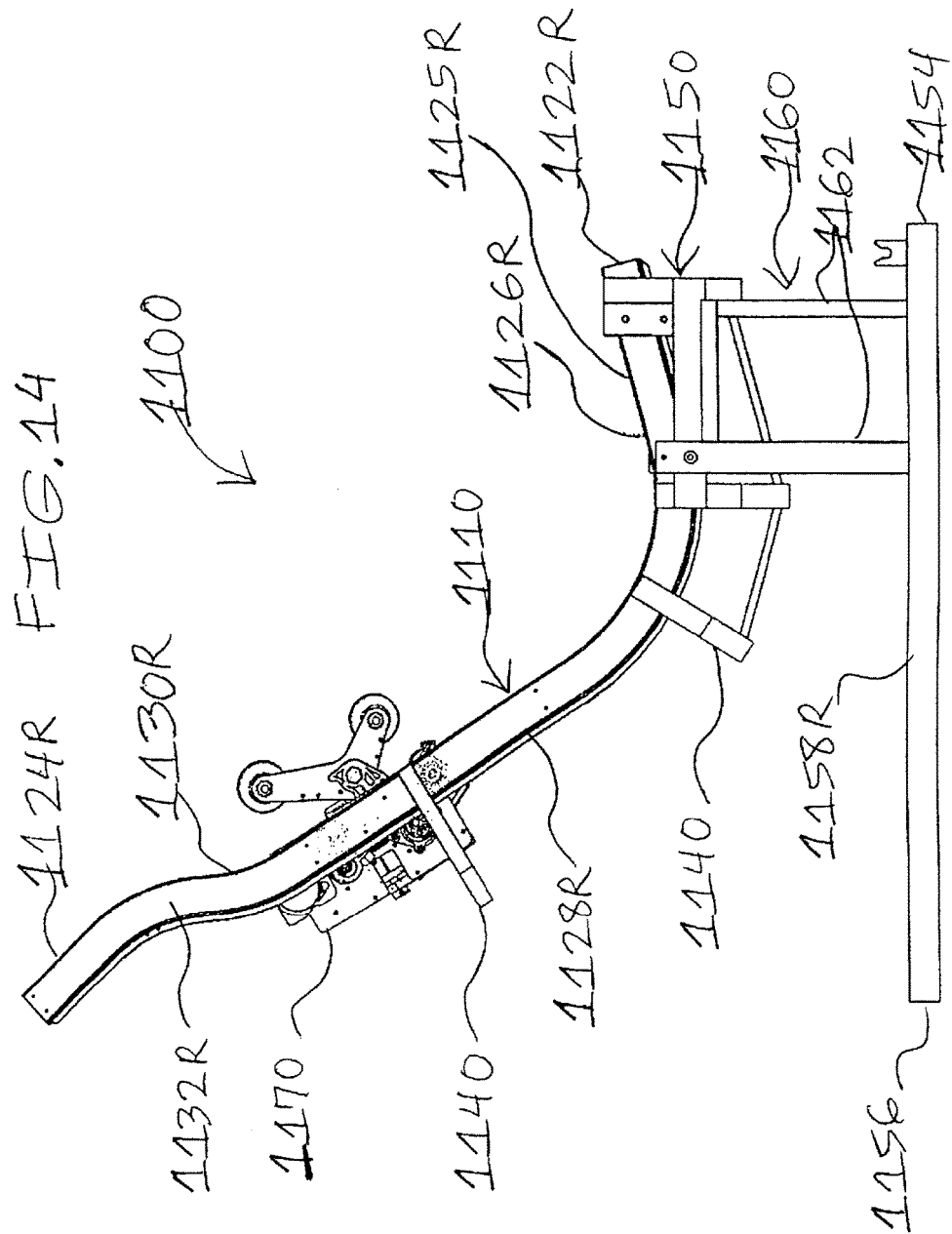
FIG. 14 is a right side view of the massage apparatus for a massage chair of FIG. 12.

As one aspect of the present invention, a non-limiting example, and best shown in FIGS. 12-14, the frame 1100 of the massage apparatus 1000 includes a pair of opposing guide rails 1120R, 1120L, a plurality of guide rails stabilizing bars 1140, and a base stand 1150. The guide rails 1120R, 1120L are secured to the base stand 1150, and are positioned generally above the base stand 1150. The base stand 1150 supports the weights of the guide rails 1120R, 1120L, massage device 1170, and user (not shown) of the massage chair.

Preferably, the guide rails 1120R, 1120L are substantially similar or mirror images of one another. Each of the guide rails 1120R, 1120L includes a first end 1122R, 1122L, a second end 1124R, 1124L, a thigh body area portion 1125R, 1125L located adjacent the first end 1122R, 1122L, a seat or bottom body area portion 1126R, 1126L located adjacent the thigh body area portion 1125R, 1125L and away from the first end 1122R, 1122L, a back body area portion 1128R, 1128L extending upward from the bottom body area portion 1126R, 1126L, a head and neck body area portion 1130R, 1130L extending upward from the back body area portion 1128R, 1128L and located about the second end 1124R, 1124L, an outer side 1132R, 1132L, an inner side 1134, and a guide channel 1136 extending from the thigh body area portion 1125R, 1125L to the back body area portion 1128R, 1128L, preferably to the head and neck body area portion 1130R, 1130L, and running along the inner side 1134 of the guide rail 1120R, 1120L. The guide channel 1136 includes gear teeth 1138 for engaging with at least one gear member from the massage device 1170 when the massage device 1170 moves upward and downward in a generally vertical direction from the first end 1122R, 1122L toward the second end 1124R, 1124L of the guide rail 1120R, 1120L and vice versa, respectively. Preferably, each of the guide rails 1120R, 1120L has a generally "L-shaped" configuration. In this configuration, the lower portion of the "L" includes the thigh body area portion 1125R, 1125L and bottom body area portion 1126R, 1126L, and the upper portion of the "L" includes the back body area portion 1128R, 1128L and head and neck body area portion 1130R, 1130L. As best shown in FIGS. 12 and 14, more preferably, each of the guide rails 1120R, 1120L has a reclining "L-shaped" configuration.

The plurality of guide rails stabilizing bars 1140 help to stabilize the positioning of the guide rails 1120R, 1120L relative to one another. Each of the guide rails stabilizing bars 1140 has a first end 1142, a second end 1144, and a body portion 1146 extending from the first end 1142 to the second end 1144. Preferably, each of the guide rails stabilizing bars 1140 has a generally "U-shaped" configuration. The guide rails stabilizing bars 1140 are secured at predetermined locations along the outer sides 1132R, 1132L of the guide rails 1120R, 1120L.

The base stand 1150 includes a base 1152 and a guide rails support structure 1160. The base 1152 includes a first or front end 1154, a second or rear end 1156, and a pair of opposing sides 1158R, 1158L. The guide rails support structure 1160 is secured about the front end 1154 of the base 1152, and is positioned above the base 1152. The guide rails support structure 1160 includes a plurality of vertical bars or members 1162 and a plurality of horizontal bars or members 1164. The plurality of vertical bars 1162 extend upward from the pair of opposing sides 1158R, 1158L of the base 1152, and, along with the plurality of horizontal bars 1164, form a support frame with a "square-shaped" or "rectangular-shaped" box configuration.

Since the base stand 1150 supports the weights of the guide rails 1120R, 1120L, massage device 1170, and user of the massage chair, the base stand 1150 is preferably made or manufactured of a strong material, such as, but not limited to, steel, metal, wood, hard plastic, any combination of the listed materials, and any material or combination of materials known to one of ordinary skill in the art. Also, the guide rails 1120R, 1120L may be made or manufactured of steel, metal, wood, plastic, any combination of the listed materials, and any material or combination of materials known to one of ordinary skill in the art.

The massage device 1170 includes a power source, at least one massage element, and at least one gear member. The massage device 1170 may be a conventional massage device or any applicable massage device that is known to one of ordinary skill in the art.

As a non-limiting example and as best shown in FIGS. 15-19, the massage device 1170 includes a pair of massage device moving members 1172R, 1172L, a pair of gear members 1174R, 1174L, a pair of massage arms 1180R, 1180L, a first motor 1176, a second motor 1178, a third motor 1190, a rotation shaft 1192 driven by the first motor 1176, a pair of rotation to knocking translator members 1194, a rotation shaft 1195 driven by the second motor 1178, a pair of rotation to kneading translator members 1196, a rotation shaft 1197 for vertical movement gears driving, a speed reduction belt 1198 for the first motor 176, and a speed reduction belt 1199 for the second motor 1178.

Figure 15:
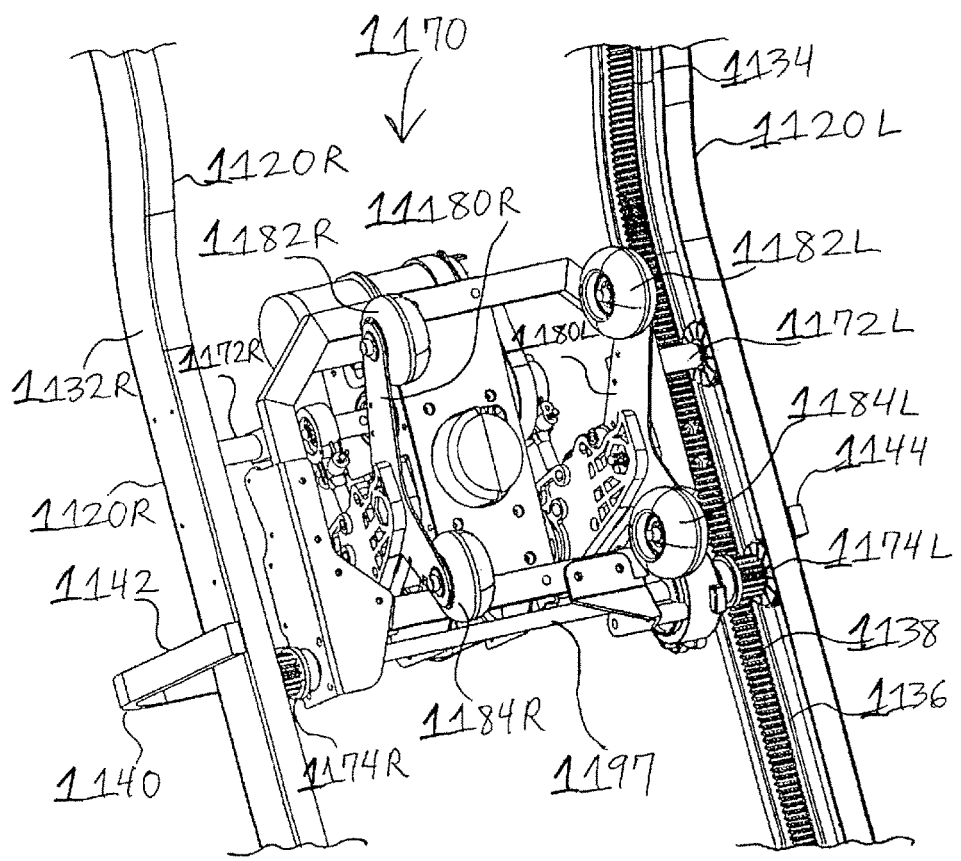
FIG. 15 is a perspective, front view of a massage device of the massage apparatus for a massage chair of FIG. 12.
Figure 16:
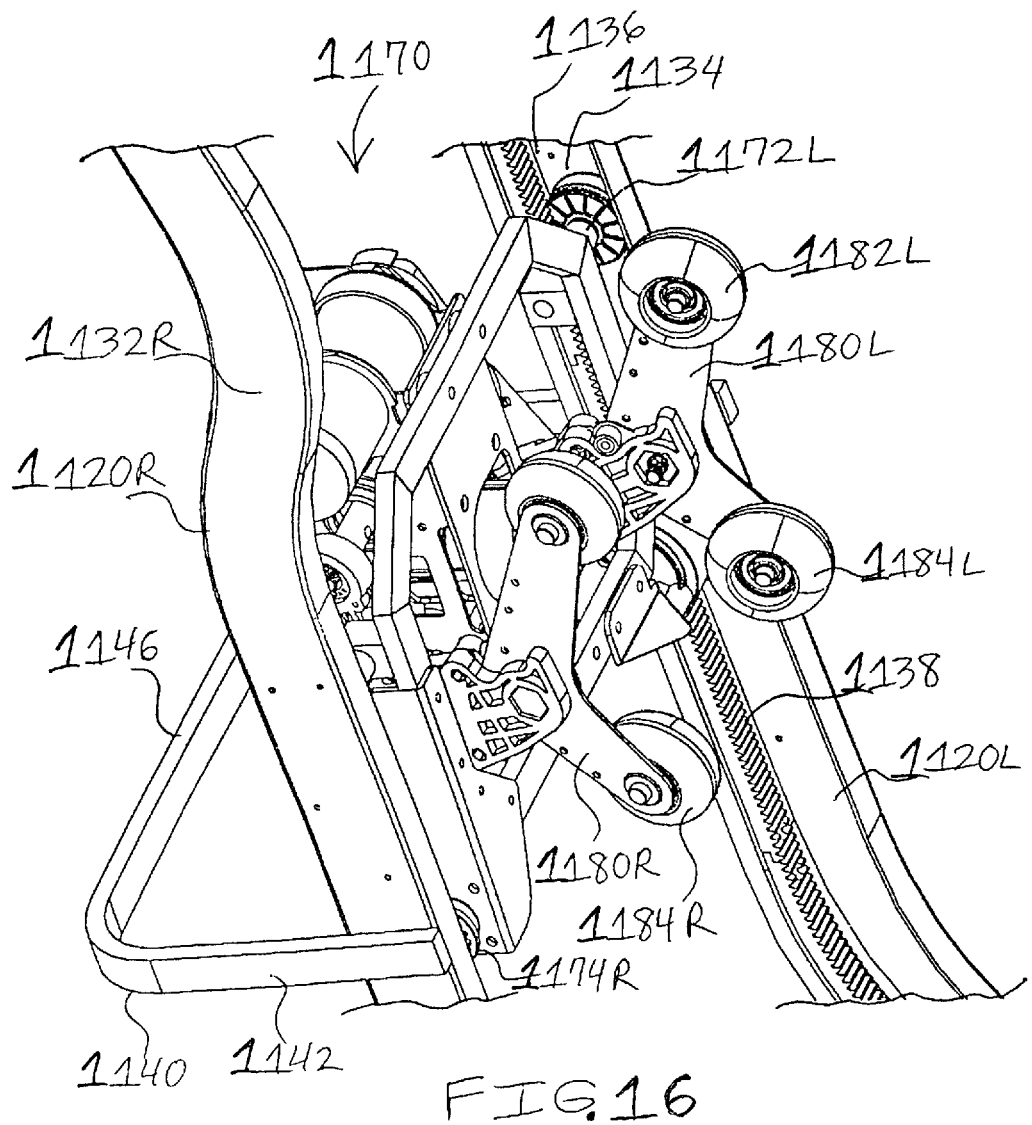
FIG. 16 is a perspective, front and right side view of a massage device of the massage apparatus for a massage chair of FIG. 12.

As best shown in FIGS. 15 and 16, each of the pair of massage device moving members 1172R, 1172L is positioned within a corresponding guide channel 1136 of a guide rail 1120R, 1120L, and helps the massage device 1170 move in a generally vertical direction along the guide channel 1136.

As best shown in FIGS. 15 and 16, each of the pair of gear members 1174R, 174L is positioned within a corresponding guide channel 1136 of a guide rail 1120R, 1120L, and engages with the teeth 1138 located in the corresponding guide channel 1136.

As best shown in FIGS. 15-19, each of the pair of massage arms 1180R, 1180L includes a first or upper massage roller 1182R, 1182L and a second or lower massage roller 1184R, 1184L. Each of the pair of massage arms 1180R, 1180L can move vertically. As a non-limiting example, each of the pair of massage arms 1180R, 1180L may be able to move both vertically and laterally. The massage rollers 1182R, 1182L, 1184R, 1184L provide massage benefits or effects to a back body area, a bottom body area, and a thigh body area of the user when the massage device 1170 is moved to, near or about that particular body area. The massage rollers 1182R, 1182L, 1184R, 1184L may also provide massage benefits or effects to a head and neck area of the user when the massage device 1170 is moved to, near or about the head and neck area. It will be understood by one of ordinary skill in the art that the timing of the pattern of the raising and lowering may be varied on each roller 1182R, 1182L, 1184R, 1184L, such as by adjusting the degree of rotation of one or more of the following: rotation shaft 1192 driven by the first motor 1176, pair of rotation to knocking translator members 1194, rotation shaft 1195 driven by the second motor 1178, pair of rotation to kneading translator members 1196, speed reduction belt 1198 for the first motor 1176, and speed reduction belt 1199 for the second motor 1178. Also, it will be understood by one of ordinary skill in the art that the rate of speed of rotation as well as the direction of rotation of the rollers 1182R, 1182L, 1184R, 1184L may be adjusted by varying the motor speed or direction.

Figure 17:
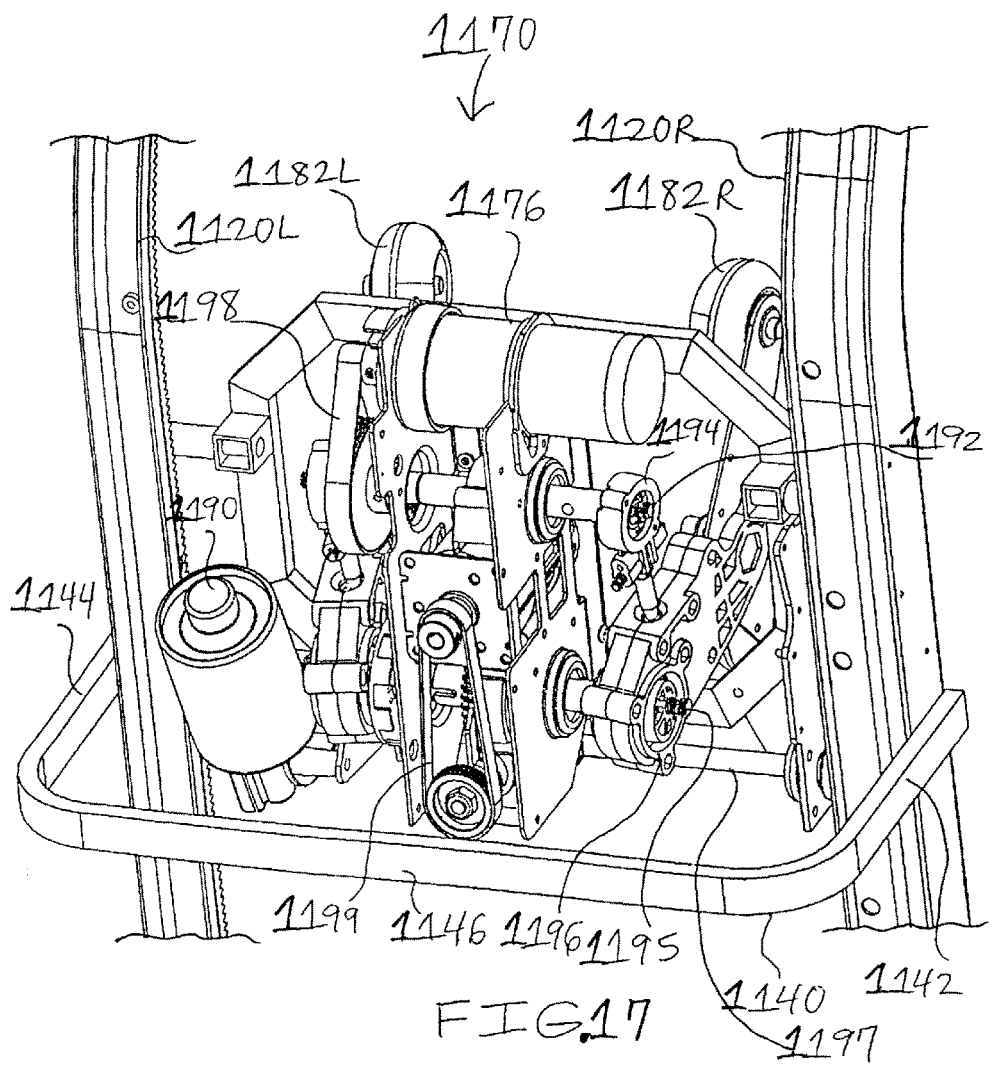
FIG. 17 is a perspective, rear view of a massage device of the massage apparatus for a massage chair of FIG. 12.
Figure 18:
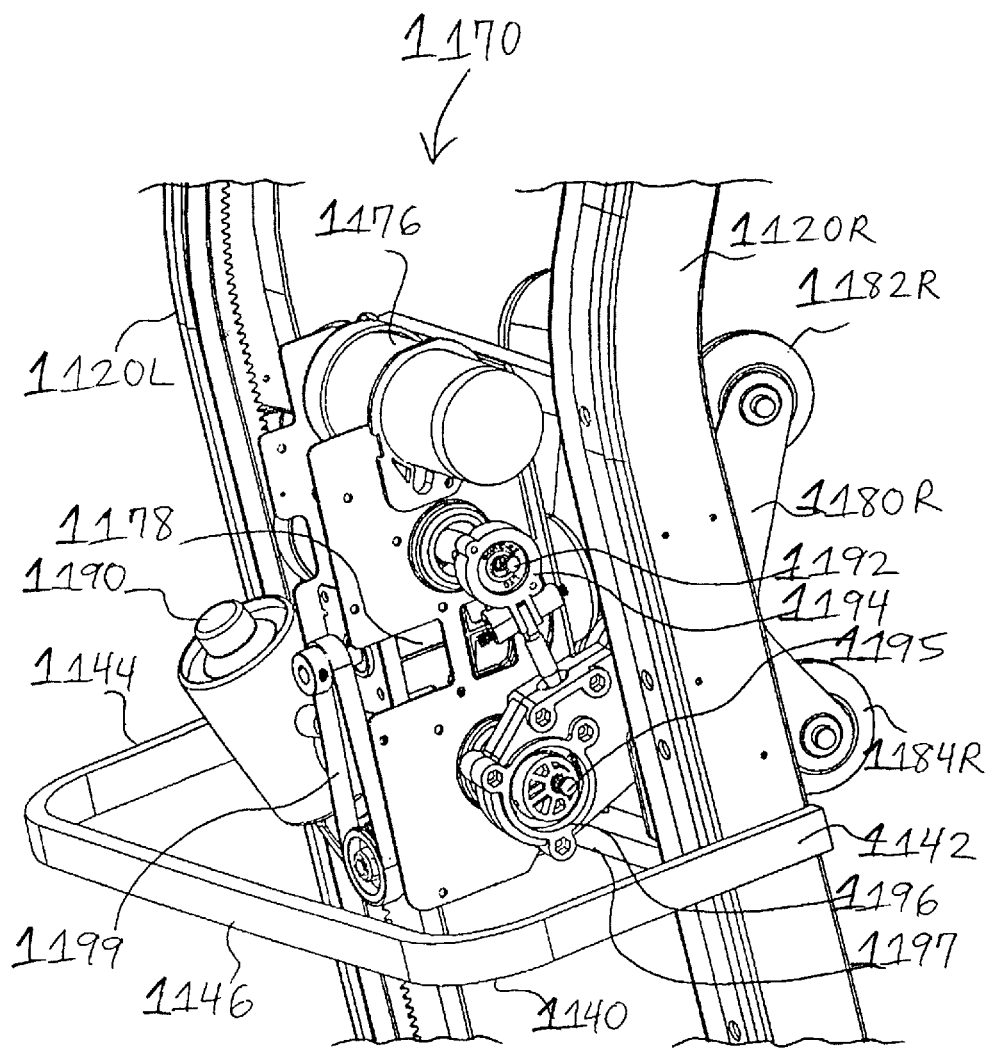
FIG. 18 is a perspective, rear and right side view of a massage device of the massage apparatus for a massage chair of FIG. 12.
Figure 19:
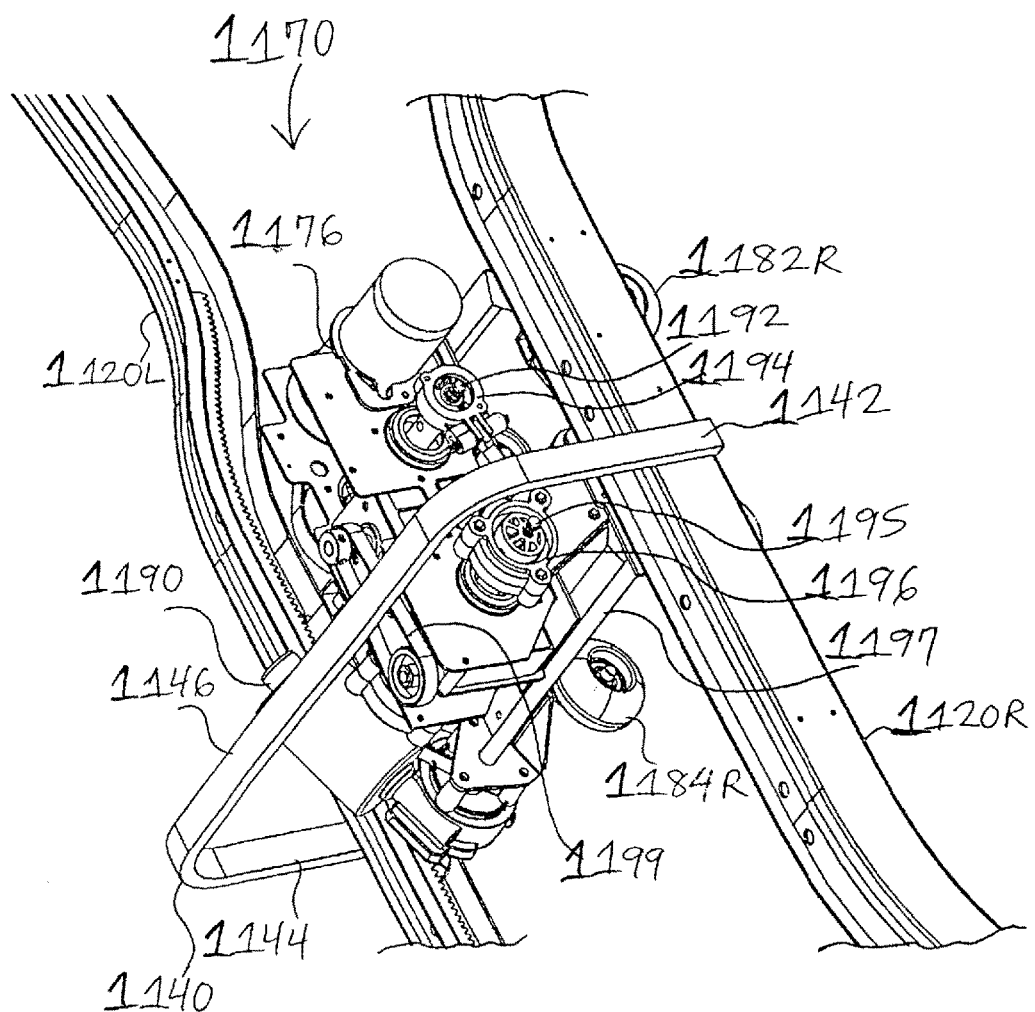
FIG. 19 is another perspective, rear and right side view of a massage device of the massage apparatus for a massage chair of FIG. 12.
Figure 20:
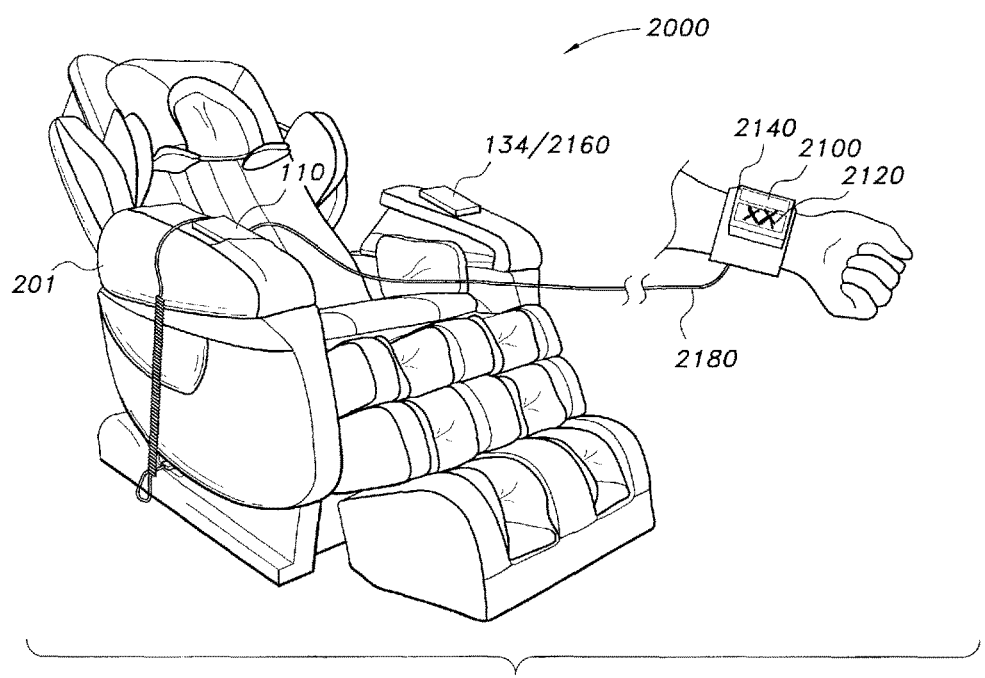
FIG. 20 is an environmental, perspective, front and right side view of a massage chair controlled by touchscreen-based control system according to the present invention, showing at least one health monitoring device or system being positioned on or secured to a user.

As best shown in FIGS. 17-19, the first and second motors 1176, 1178 provide power to the pair of massage arms 1180R, 1180L, respectively, while the third motor 1190 provides power for the generally vertical movement of the massage device 1170.

As best shown in FIGS. 17-19, the rotation shaft 1192 driven by the first motor 1176 causes the first massage arm 1180R to be activated and to carry out its massage actions when this rotation shaft 1192 is rotated.

As best shown in FIGS. 17-19, each of the pair of rotation to knocking translator members 1194 assists the corresponding massage arm 1180R, 1180L and corresponding massage roller(s) 1182R, 1182L, 1184R, 1184L to carry out its knocking massage actions when the corresponding rotation shaft 1192, 1195 is rotated.

As best shown in FIGS. 17-19, the rotation shaft 1195 driven by the second motor 1178 causes the second massage arm 1180L to be activated and to carry out its massage actions when this rotation shaft 1195 is rotated.

As best shown in FIGS. 17-19, each of the pair of rotation to kneading translator members 1196 assists the corresponding massage arm 1180R, 1180L and corresponding massage roller(s) 1182R, 1182L, 1184R, 1184L to carry out its kneading massage actions when the corresponding rotation shaft 1192, 1195 is rotated.

As best shown in FIGS. 17-19, the rotation shaft 1197 for vertical movement gears driving causes the massage device 1170 to move upward or downward when this rotation shaft 1197 is rotated.

As best shown in FIG. 17, the speed reduction belt 1198 for the first motor 1176 adjusts the speed of the first massage arm 1180R.

As best shown in FIGS. 17-19, the speed reduction belt 1199 for the second motor 1178 adjusts the speed of the second massage arm 1180L.

When in use or in operation, the user (not shown) may activate the massage device 1170 of the massage apparatus 1000 for a massage chair by or via pushing, touching, using voice command for use on or with, using a mechanical or remote control for use on or with, or any other activation method known to one of ordinary skill in the art, an activation, start, control or command button, touch area, box or panel, or any other activation method or element known to one of ordinary skill in the art. Preferably, the user is able to control the generally vertical movement of the massage device 1170 and massage rollers 1182R, 1182L, 1184R, 1184L upward and downward along the guide rails 1120R, 1120L such that the massage device 1170 and massage rollers 1182R, 1182L, 1184R, 1184L are positioned about, near or at a desired body part area, such as the thighs, bottom, lower back, upper back, and head and neck, of the user so that desired body part area of the user can receive massage effects or benefits from the massage rollers 1182R, 1182L, 1184R, 1184L when desired. Preferably, the user is also able to control the timing, movement, etc. of the massage rollers 1182R, 1182L, 1184R, 1184L such that that the massage rollers 1182R, 1182L, 1184R, 1184L can provide different massage effects or benefits, such as knocking, kneading, etc., to the desired body part area of the user at a particular moment or time.

Referring to FIG. 20 and as another aspect of the present invention, the massage chair 2000 controlled by a touchscreen-based control system includes a touchscreen-based control system, a massage apparatus, and at least one health monitoring device or system 2100. Preferably, the touchscreen-based control system in this aspect of the present invention is the touchscreen-based control system 100 described above. Preferably, the massage apparatus is massage apparatus 1000, described above, that includes the frame 1100 and massage device 1170, or is a massage apparatus that is substantially similar to massage apparatus 1000.

As a non-limiting example shown in FIG. 20, the at least one health monitoring device or system 2100 is a portable, wrist blood pressure and heart rate monitoring device 2100 that is manufactured and/or programmed to measure or obtain the blood pressure and heart rate of the user right at or near the massage chair 2000 when the user is preferably positioned on the massage chair 2000. The blood pressure and heart rate monitoring device 2100 is compact, convenient, and does not interfere with the massage functions of the massage chair 2000. The blood pressure and heart rate monitoring device 2100 provides blood pressure and heart rate measurements, and alerts the user and/or other persons, such as, but not limited to, an individual who is monitoring the user's blood pressure and heart rate. The measurement data 2120 that is obtained from the user is displayed either on the device screen 2140 or on a remote control 2160 of the massage chair 2000. The blood pressure and heart rate monitoring device 2100 can be quickly connected to or disconnected from the massage chair 2000 via a connector or cord 2180, such as, but not limited to, a detachable DC power supply cord.

As an alternative to the blood pressure and heart rate monitoring device 2100 of this embodiment, the at least one health monitoring device 2100 may be a blood pressure monitoring or measuring device and a heart rate monitoring or measuring device that are separate from one another, or just either of those devices. As another alternative to the blood pressure and heart rate monitoring device 2100 of this embodiment, the at least one health monitoring device 2100 may encompass any individual or combinations of health monitoring functions, such as, but not limited to, blood pressure monitoring and/or measuring, heart rate monitoring or measuring, cholesterol monitoring or measuring, fat monitoring or measuring, and blood sugar monitoring or measuring. Alternatively, the at least one health monitoring device 2100 may be or include any health monitoring device(s) that is/are known to one of ordinary skill in the art.

It is to be understood that the present invention is not limited to the embodiments described above or as shown in the attached figures, but encompasses any and all embodiments within the spirit of the invention.

What is claimed is:

1. A touchscreen-based control system for a massage chair, said system comprising:
   a touchscreen device in operative communication with a massage chair that provides massage effects to a back body area and a feet and legs area of a user,
   wherein said touchscreen device comprises a housing, a transparent, touch-sensitive layer, a touch controller, a processor, a display controller, a display layer, a printed circuit board (PCB), a software program comprising information that may be provided to the user in response to touch inputs from the user, and a software program in operative communication with the massage chair, wherein said housing houses or provides mechanical support to at least said transparent, touch-sensitive layer, said display layer, and said PCB, wherein said transparent, touch-sensitive layer has sufficient sensitivity to receive touch inputs from the user to communicate with the massage chair whereby the massage chair communicates with a massage device of the massage chair to provide massage effects to the user, wherein said touch controller identifies touch inputs from the user, wherein said processor processes the touch inputs and operatively communicates with the massage chair by sending digital information to a chair motherboard, wherein said display controller generates display signals for display on said display layer in response to touch inputs from the user, wherein said software program in operative communication with the massage chair effectuates the massage chair to communicate with the massage device to provide massage effects to the user in response to the touch inputs, and wherein, when the user selects a selection on said display layer, a control signal is sent to the chair motherboard whereby the massage chair turns on or off a massage feature to provide massage effects to a specific body area of the user at a particular moment or time.

2. The system according to claim 1, wherein said information that may be provided to the user in response to touch inputs from the user comprises predetermined, user-selectable selections of information that includes information selected from a group consisting of a plurality of selectable massage intensity settings, a plurality of selectable chair position settings, a plurality of selectable chair heat settings, health-related information, a plurality of songs, chair and safety related information, settings related information, and any combination thereof.

3. The system according to claim 1, wherein said information that may be provided to the user in response to touch inputs from the user comprises predetermined, user-selectable selections of information that includes information selected from a group consisting of health-related information, a plurality of songs, a chair and safety related information, and settings related information.

4. The system according to claim 1, further comprising a music player and at least one speaker.

5. The system according to claim 1, further comprising a device for providing Internet access.

6. The system according to claim 1, further comprising a remote control that is in operative communication with the massage chair.

7. A touchscreen-based control system for a massage chair, said system comprising:
a touchscreen device in operative communication with a massage chair that provides massage effects to at least one body area of a back body area, a bottom body area, a thigh body area, and a feet and legs area of a user,
wherein said touchscreen device comprises a housing comprising a top portion and a bottom portion, a transparent, touch-sensitive layer, a touch controller, a processor, a display controller, a display layer, a printed circuit board (PCB), a software program comprising predetermined, user-selectable selections of information that may be provided to the user in response to touch inputs from the user, and a software program in operative communication with the massage chair, wherein said housing houses or provides mechanical support to at least said transparent, touch-sensitive layer, said display layer, and said PCB, wherein said transparent, touch-sensitive layer is positioned above said display layer, wherein said display layer is positioned above said PCB, wherein said PCB is positioned about said bottom portion of said housing, wherein said transparent, touch-sensitive layer has sufficient sensitivity to receive touch inputs from the user to communicate with the massage chair whereby the massage chair communicates with a massage device of the massage chair to provide massage effects to the user, wherein said touch controller identifies touch inputs from the user, wherein said processor processes the touch inputs and operatively communicates with the massage chair by sending digital information to a chair motherboard, wherein said display controller generates display signals for display on said display layer, of selected information of said predetermined, user-selectable selections of information in response to the touch inputs from the user, wherein said software program in operative communication with the massage chair effectuates the massage chair to communicate with the massage device to provide massage effects to the user in response to the touch inputs, and wherein, when the user selects a selection on a said display layer, a control signal is sent to the chair motherboard whereby the massage chair turns on or off a massage feature to provide massage effects to a specific body area of the user at a particular moment or time.

8. The system according to claim 7, wherein said predetermined, user-selectable selections of information includes information selected from a group consisting of a plurality of selectable massage intensity settings, a plurality of selectable chair position settings, a plurality of selectable chair heat settings, health-related information, a plurality of songs, a chair and safety related information, settings related information, and any combination thereof.

9. The system according to claim 7, wherein said information that may be provided to the user in response to touch inputs from the user comprises predetermined, user-selectable selections of information that includes information selected from a group consisting of health-related information, a plurality of songs, a chair and safety related information, and settings related information.

10. The system according to claim 7, further comprising a remote control that is in operative communication with the massage chair.

11. A massage chair controlled by a touchscreen-based control system, said massage chair comprising:
a chair comprising a massage apparatus that comprises a frame and a massage device,
wherein said frame comprises at least one guide rail,
wherein each of said at least one guide rail comprises a first end, a second end, a bottom body area portion located rearward of said first end, and a back body area portion extending upward from said bottom body area portion toward said second end,
wherein said massage device comprises a power source and at least one massage element, wherein said massage device is secured to said at least one guide rail, and wherein said power source provides power to said massage device wherein said at least one massage element is moved with respect to said at least one guide rail whereby said at least one massage element is able to provide massage effects to at least one of a bottom body area and a back body area of a user; and a touchscreen-based control system comprising a touchscreen device in operative communication with said chair, wherein said touchscreen device comprises a housing, a transparent, touch-sensitive layer, a touch controller, a processor, a display controller, a display layer, a printed circuit board (PCB), a software program comprising information that may be provided to a user in response to touch inputs from the user, and a software program in operative communication with said chair, wherein said housing houses or provides mechanical support to at least said transparent, touch-sensitive layer, said display layer, and said PCB, wherein said transparent, touch-sensitive layer has sufficient sensitivity to receive touch inputs from the user to communicate with said chair whereby said chair communicates with said massage device to provide massage effects to the user, wherein said touch controller identifies touch inputs from the user, wherein said processor processes the touch inputs and operatively communicates with said chair by sending digital information to a chair motherboard, wherein said display controller generates display signals for display on said display layer in response to the touch inputs from the user, wherein said software program in operative communication with said chair effectuates said chair to communicate with said massage device to provide massage effects to the user in response to the touch inputs, and wherein, when the user selects a selection on said display layer, a control signal is sent to said chair motherboard whereby said chair turns on or off a massage feature to provide massage effects to a specific body area of the user at a particular moment or time.

12. The massage chair according to claim 11, wherein said information that may be provided to the user in response to touch inputs from the user comprises predetermined, user-selectable selections of information that includes information selected from a group consisting of a plurality of selectable massage intensity settings, a plurality of selectable chair position settings, a plurality of selectable chair heat settings, health-related information, a plurality of songs, a chair and safety related information, settings related information, and any combination thereof.

13. The massage chair according to claim 11, wherein said information that may be provided to the user in response to touch inputs from the user comprises predetermined, user-selectable selections of information that includes information selected from a group consisting of health-related information, a plurality of songs, a chair and safety related information, and settings related information.

14. The massage chair according to claim 11, further comprising a device for providing Internet access.

15. The system according to claim 7, further comprising at least one health monitoring or measuring device selected from the group consisting of a blood pressure monitoring device, a blood pressure measuring device, a heart rate monitoring device, a heart rate measuring device, a cholesterol monitoring device, a cholesterol measuring device, a fat monitoring device, a fat measuring device, a blood sugar monitoring device, a blood sugar measuring device, and any combination thereof.

16. The system according to claim 7, further comprising at least one health monitoring or measuring device selected from the group consisting of a cholesterol monitoring device, a cholesterol measuring device, a fat monitoring device, a fat measuring device, a blood sugar monitoring device, a blood sugar measuring device, and any combination thereof.

17. The massage chair according to claim 11, further comprising a music player and at least one speaker.

18. The massage chair according to claim 11, further comprising a remote control that is in operative communication with said chair.

19. The system according to claim 1, further comprising at least one health monitoring or measuring device selected from the group consisting of a blood pressure monitoring device, a blood pressure measuring device, a heart rate monitoring device, a heart rate measuring device, a cholesterol monitoring device, a cholesterol measuring device, a fat monitoring device, a fat measuring device, a blood sugar monitoring device, a blood sugar measuring device, and any combination thereof.

20. The system according to claim 1, further comprising at least one health monitoring or measuring device selected from the group consisting of a cholesterol monitoring device, a cholesterol measuring device, a fat monitoring device, a fat measuring device, a blood sugar monitoring device, a blood sugar measuring device, and any combination thereof.

21. The system according to claim 1, wherein said touchscreen device is an LCD touchscreen device or an LED touchscreen device.

22. The system according to claim 7, further comprising a music player and at least one speaker.

23. The system according to claim 7, further comprising a device for providing Internet access.

24. The system according to claim 7, wherein said touchscreen device is an LCD touchscreen device or an LED touchscreen device.

25. The massage chair according to claim 11, further comprising at least one health monitoring or measuring device selected from the group consisting of a blood pressure monitoring device, a blood pressure measuring device, a heart rate monitoring device, a heart rate measuring device, a cholesterol monitoring device, a cholesterol measuring device, a fat monitoring device, a fat measuring device, a blood sugar monitoring device, a blood sugar measuring device, and any combination thereof.

26. The massage chair according to claim 11, further comprising at least one health monitoring or measuring device selected from the group consisting of a cholesterol monitoring device, a cholesterol measuring device, a fat monitoring device, a fat measuring device, a blood sugar monitoring device, a blood sugar measuring device, and any combination thereof.

27. The massage chair according to claim 11, wherein said touchscreen device is an LCD touchscreen device or an LED touchscreen device.

28. The massage chair according to claim 11, wherein each of said at least one guide rail further comprises a neck body area portion extending upward from said back body area portion toward said second end, and a head body area portion extending upward from said neck body area portion and located about said second end.

29. The massage chair according to claim 11, wherein said chair further comprises a feet and legs massage apparatus that provides massage benefits to a feet and legs area of the user.

30. The massage chair according to claim 11,
wherein said frame further comprises a base stand,
wherein said at least one guide rail is a first guide rail and a second guide rail,
wherein each of said first guide rail and said second guide rail further comprises an inner side and a guide channel extending from said thigh body area portion through said back body area portion,
wherein each guide channel correspondingly runs along said inner side of a corresponding guide rail of said guide rails,
wherein each guide channel comprises gear teeth,
wherein each of said guide rails has a generally "L-shaped" configuration, and
wherein said guide rails are secured to and positioned generally above said base stand,
wherein said massage device further comprises a guide rail engagement mechanism,
wherein said gear teeth of said guide channels engage with at least one gear member of said massage device when said massage device moves from said first end toward said second end of said guide rails and vice versa, respectively,
wherein said at least one massage element is configured to provide massaging effects to both the left side and right side of a body of a user and is also configured to provide massaging effects to a thigh body area, a bottom body area, and a back body area of the user, and
wherein said at least one massage element is configured to move both vertically and laterally in providing massaging effects to a corresponding body area of the user as said massage device is temporarily held in place or is moving along said guide channels.

31. The system according to claim 1, wherein said touchscreen device further comprises a transparent, protective layer, and wherein said transparent, protective layer is positioned above and in sufficient proximity to said transparent, touch-sensitive layer such that said transparent, protective layer protects said transparent, touch-sensitive layer from damage and also allows touch inputs from the user to be received by said transparent, touch-sensitive layer.

32. The system according to claim 7, wherein said touchscreen device further comprises a transparent, protective layer, and wherein said transparent, protective layer is positioned above and in sufficient proximity to said transparent, touch-sensitive layer such that said transparent, protective layer protects said transparent, touch-sensitive layer from damage and also allows touch inputs from the user to be received by said transparent, touch-sensitive layer.

33. The massage chair according to claim 11, wherein said touchscreen device further comprises a transparent, protective layer, and wherein said transparent, protective layer is positioned above and in sufficient proximity to said transparent, touch-sensitive layer such that said transparent, protective layer protects said transparent, touch-sensitive layer from damage and also allows touch inputs from the user to be received by said transparent, touch-sensitive layer.

* * * * *